United States Patent
Bachmann

(10) Patent No.: US 9,908,141 B2
(45) Date of Patent: Mar. 6, 2018

(54) DEVICE TO DISPERSE PARTICLES ONTO A SURFACE

(75) Inventor: Gerhard Bachmann, Schwelm (DE)

(73) Assignee: Kronoplus Technical AG, Niederteufen (CH)

( * ) Notice: Subject to any disclaimer, the term of this patent is extended or adjusted under 35 U.S.C. 154(b) by 587 days.

(21) Appl. No.: 12/566,068

(22) Filed: Sep. 24, 2009

(65) Prior Publication Data

US 2010/0080896 A1    Apr. 1, 2010

(30) Foreign Application Priority Data

Sep. 30, 2008    (EP) ...................................... 08017203

(51) Int. Cl.
  *B05C 19/04*    (2006.01)
  *B32B 21/00*    (2006.01)
  *B65G 31/04*    (2006.01)

(52) U.S. Cl.
  CPC .............. *B05C 19/04* (2013.01); *B32B 21/00* (2013.01); *B65G 31/04* (2013.01)

(58) Field of Classification Search
  USPC ............................. 118/308–311, 506, DIG. 4
  See application file for complete search history.

(56) References Cited

U.S. PATENT DOCUMENTS

| | | | | |
|---|---|---|---|---|
| 2,594,348 A | * | 4/1952 | Rockoff ............. | B29D 99/0035 264/49 |
| 2,737,319 A | * | 3/1956 | Rayburn ....................... | 222/312 |
| 2,897,577 A | * | 8/1959 | Stuewer .............. | D06M 13/525 28/288 |
| 3,667,422 A | | 6/1972 | Saladin | |
| 3,740,062 A | * | 6/1973 | Robins ......................... | 277/592 |
| 4,245,581 A | | 1/1981 | Spencer | |
| 4,530,596 A | * | 7/1985 | Kawamoto ............ | G03G 21/00 15/256.52 |
| 5,365,815 A | * | 11/1994 | Pfaff, Jr. ......................... | 83/154 |
| 6,610,147 B2 | * | 8/2003 | Aschenbeck ................. | 118/308 |
| 2006/0275575 A1 | | 12/2006 | Doehring | |

FOREIGN PATENT DOCUMENTS

| | | |
|---|---|---|
| CH | 536727 | 6/1973 |
| CN | 1549750 A | 11/2004 |
| DE | 608898 | 2/1935 |
| DE | 2939828 | 4/1981 |

(Continued)

OTHER PUBLICATIONS

Durometer Made Easy from Paramount PDS.*
European Search Report for corresponding application No. EP08017203 dated Feb. 24, 2009.

*Primary Examiner* — Binu Thomas
(74) *Attorney, Agent, or Firm* — Renner, Otto, Boisselle & Sklar, LLP

(57) ABSTRACT

The invention relates to a device (1) to disperse particles (12) onto a surface (46). To this aim, the device comprises a container (20) for the particles to be dispersed having at least one scatter opening (22) to dispend particles, a roller like distributing element (30) with a curved surface (36), and means (32) with which the roller like distributing element can be brought into vibration in longitudinal direction, such that particles (12) will be moved out of the scatter opening (22) over the curved surface (36) downwardly in the direction of the surface to be sprinkled.

18 Claims, 3 Drawing Sheets

(56) References Cited

FOREIGN PATENT DOCUMENTS

| | | |
|---|---|---|
| DE | 19817805 | 10/1999 |
| DE | 19817805 A1 * | 10/1999 |
| EP | 0329154 | 8/1989 |
| WO | 9847705 | 10/1998 |
| WO | 05/042644 | 5/2005 |

* cited by examiner

DEVICE TO DISPERSE PARTICLES ONTO A SURFACE

1. FIELD OF THE INVENTION

The present invention relates to a device to disperse particles, in particular onto a surface of wood material panels or impregnates, as well as to a method for the dispersion of particles.

2. TECHNICAL BACKGROUND

From the prior art a number of methods are known to disperse or sprinkle particles onto surfaces. From document WO 05/042644 for example a scatter device is known, by means of which the surface of a flooring panel can be sprinkled with abrasion-resistant particles. The abrasion-resistant particles consist for example of corundum or silicon compounds and are sprinkled onto the still wet decor paper of a known laminate panel. After curing of the decor paper under pressure and heat a very resistant surface is formed. The scatter device comprises two rollers, a steel roller as well as a brush roller, which are arranged parallel to each other. The steel roller is provided with small pockets or dimples on its surface and arranged rotatable. Above the steel roller a container is arranged to hold the corundum particles and which dispenses these particles onto the rotating surface of the steel roller in a controlled manner. The dispersed corundum particles collect in the dimples or pockets of the steel roller and are doctored off due to the rotating of the roller and are conveyed further. The brush roller is likewise arranged rotatable and arranged parallel to the side next to the steel roller so that the brush elements can brush out the filled dimples or pockets at the surface of the steel roller. Thereby, the particles which have collected in the dimples or pockets fall down and onto the laminate panels or impregnates which are passed underneath the rollers. The device comprises further conveying equipment by means of which the panels or laminates can be passed in a controlled speed underneath the rollers. The term "impregnate" is widely used in the industry and denotes papers impregnated with resin, as for example the above-mentioned decor papers. These papers serve for example as part of or intermediate product during the manufacturing of laminates.

Although the device work satisfactorily there is still room for improvement. For one it is desirable to improve the control of the dosing of the amount of dispersed particles per time unit along the width. Further, the uniformity of the dispersion of the particles onto the surface can be further improved. A big disadvantage of the above-mentioned device is further, that during the brushing out of the abrasion-resistant particles from the surface respectively out of the pockets in the steel roller, the same is subjected to wear, since the abrasion-resistant particles are considerably tougher than the steel of the steel roller. For this reason, the steel rollers of the prior art have to be exchanged regularly approximately every sixth months in an uninterrupted operation. Thereby costs occur, and the quality of the dispersion at the end of the service time of the steel roller deteriorates.

The above described device is intended to sprinkle the surface of laminate panels or impregnates and similar. Laminate panels usually consist of a four to eight millimeter thick carrier board made from MDF or HDF, onto which upper side a so called decor paper, i.e. a paper printed with a décor and impregnated with a resin, is applied under the application of pressure and heat.

On the bottom side of the carrier board a counter acting paper impregnated with resin is arranged, which serves to counteract a distortion of the carrier board by the applied decor paper. Onto the decor paper an abrasion-resistant layer comprising small corundum particles (which are embedded in a resin matrix), have to be applied, to provide the surface with the necessary durability.

It is the object starting from this prior art to provide a device to disperse particles onto a surface, which eliminates respectively reduces the above-mentioned disadvantages of the prior art. It is in particular an object to provide a device, which allows a well controlled dispersion and which is subjected to a lower amount of wear and can thus be run more cost efficient. It is in particular the object of the invention to provide a device to disperse abrasion resistant particles onto the surface of panels made from wood materials, in particular of laminate panels, as described above.

These and other objects, which will become apparent upon reading the following description or which the skilled person will recognize, are solved by a device according to claim 1 and a method according to claim 15.

3. DETAILED DESCRIPTION OF THE INVENTION

The inventive device to disperse or sprinkle particles onto a surface is in particular suited to sprinkle abrasion-resistant particles, as for example corundum particles onto the surface of panels made from wood materials, impregnates and similar, in particular laminate panels, and comprises a container for the particles to be dispersed having at least one scatter opening to output particles, as well as a roller like distributing element with a curved surface. The scatter opening is arranged above the curved surface of the distributing element and extends preferably parallel to the longitudinal axis of the roller like distributing element. The length of the scatter opening is preferably chosen based on the size of the surface to be sprinkled, which is also true for the length of the roller like distributing element. If for example a surface having a width of two meters is to be sprinkled, the roller like distributing element and the scatter opening likewise should be at least two meters long. In all the herein described embodiments, the scatter opening is preferably a slot (scatter slot).

According to the invention, the device comprises further means, by means of which the roller like distributing element can be put into vibration in longitudinal direction. Thereby, particles are conveyed from the scatter opening via the curved surface downwards in the direction of the surface to be sprinkled. The vibration of the distributing element fulfils preferably several functions. For one, it allows for a homogeneous distribution respectively sprinkling of the particles onto the surface to be sprinkled. On the other hand, due to the vibration, the necessity to rotate the roller like distributing element is omitted, as well as the necessity of a brush roller, by means of which the particles were brushed off from the surface of the distributing element in the prior art. Surprisingly, it was found that by means of the vibration of the distributing element no or almost no wear occurs at the surface of the distributing element. For this reason the device according to the invention allows a particular advantageous handling of abrasion resistant particles, as for example corundum particles.

It should be clear to the skilled person that the term container for the particles to be sprinkled has a broad meaning and denotes any kind of holding device, by means of which the particles to be sprinkled can be provided in the sense of the invention. Essential for the invention is rather the scatter opening respectively the scatter slot and its orientation with regard to the roller like distributing element. The roller like distributing element is preferably a roller, and in particular a steel roller, since such rollers are widely available and relatively inexpensive. However, it should be clear to the skilled person that it is rather the effective curved surface of the distributing element which is essential for the invention, i.e. the surface, which comes into contact with the particles to be sprinkled and which is effective for the sprinkling action of the particles. For example, the roller like distributing element could comprise a roller, which is "cut" in longitudinal direction, i.e. which is provided for example with a cross section in form of a halve circle, a three-quarter circle or a quarter circle.

Experiments conducted by applicant have shown that for a particular effective sprinkling action the curve of the curved surface should preferably be in form of a circular arc. This circular arc should have in particular an inscribed angle ("Mittelpunktswinkel") of at least seventy degrees; preferably at least eight degrees, even more preferred at least proximately ninety degrees and most preferred at least approximately one hundred degrees.

In a particularly preferred embodiment at least the effective curved surface of the roller like distributing element is provided with a coating. This coating is preferably a rubber, which is attached to the surface of the distributing element in known manner, in particular by means of a vulcanizing process. The distributing element is preferably in all the embodiments described herein manufactured from steel. Applicant has surprisingly found that a rubber coating of the surface of the roller like distributing element improves the uniformity of the sprinkling of the particles compared to a pure steel surface. Further it was found, that the rubber coating considerably improves the wear resistance compared to a pure steel surface. This is in particular true for the application of abrasion-resistant particles, as for example corundum particles. This is surprising, since the rubber surface naturally has a considerably lower hardness as for example a steel surface. It is assumed that the rubber coating due to its elastic properties is less susceptible against the sharp edges of the particles to be sprinkled than the tougher, however none elastic steel surface.

As it was already mentioned, the device is in particular well suited for the handling of abrasion-resistant particles, as for example corundum particles. The above described rubber or rubber coating should preferably have a Shore A hardness between 40 and 80 Shore, preferably 50 and 70 Shore and particularly preferred between 55 and 65 Shore. The Shore hardness is a well known characteristic material value for elastomare and plastics and identified in the norms DIN 53505 and DIN 7868.

A skilled person knows several mechanical vibrators for producing the vibration of the roller like distributing element. The distributing element is preferably supported such that it can oscillate and is for example excited with a vibrator means or oscillator means in a frequency range of 10 to 250 Hz, preferably 20 to 150 Hz and most preferred from 30 to 80 Hz. The oscillating movement is in the range of only a few tenths of a millimeter, as for example 0.1 millimeters. It was found that these frequency ranges lead to particularly good results. It should be clear to the skilled person that in all the embodiments described herein the roller like distributing element does not need to be rotated around its longitudinal axis, but that it can rather be mounted none rotatable.

The device allows a particular good adjustment of the amount of particles dispensed. Preferably, the device allows the adjustment of the distance between the scatter slot respectively the scatter opening and the curved surface of the roller like distributing element, to vary the amount of dispensed particles. The larger the distance, the more particles are dispensed over a given unit of time. Likewise, the amount of dispensed particles can be influenced by adjusting the vibration, respectively the frequency. Therefore, the means to bring the distributing element into vibration are preferably adjustable to adjust a suitable frequency depending on the intended use. The device is in particular suitable to handle particles with a diameter of 60 to 120 µm and in particular for particles with an average grit size 220 to 150.

4. DESCRIPTION OF PREFERRED EMBODIMENTS

In the following a detailed description of the figures will be given:

Figure 1:
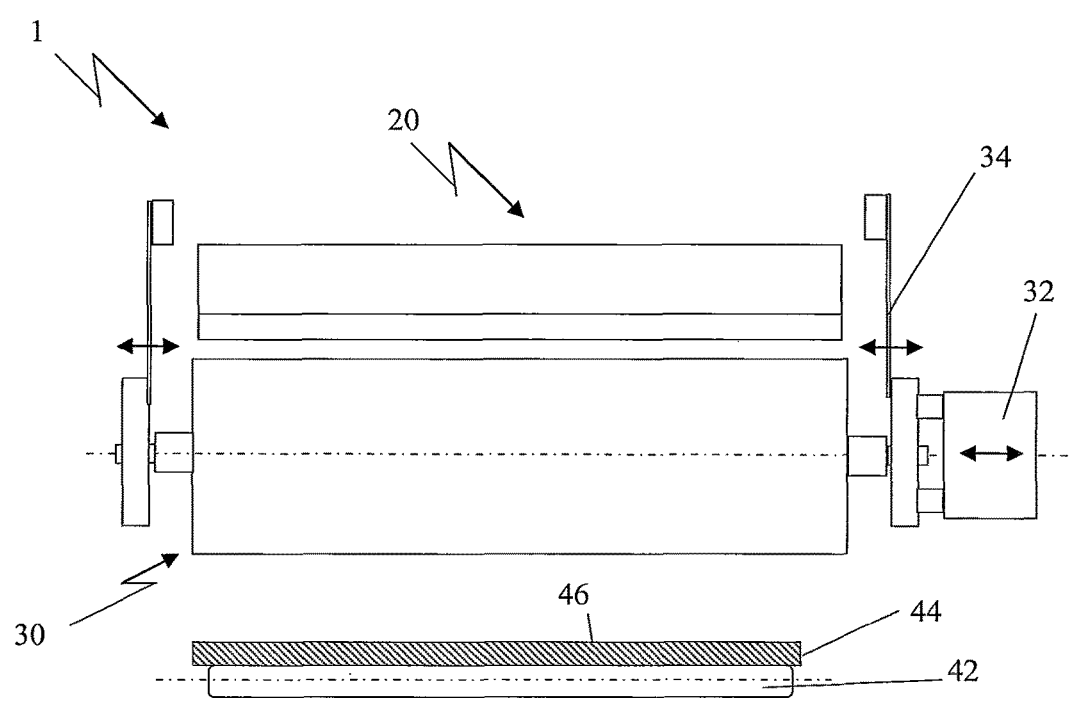
FIG. 1 is a schematic front view of a device to disperse particles according to the invention.

In FIG. 1 a device 1 for the sprinkling of particles onto a surface is shown in a schematic front view. The device comprises a container 20 for the particles to be sprinkled as well as a roller like distributing element 30 which is arranged underneath container 20. To the right hand in the figure next to the distributing element 30 a means 32 is arranged, by means of which the distributing element 30 can be excited to vibrate in the direction of its longitudinal axis (indicated by the double headed arrow). Means 32 in the shown case is a mechanic vibrator and works preferably in a frequency range of 10 to 250 Hz, particularly preferred from 20 to 150 Hz and most preferred from 30 to 80 Hz. The distributing element 30 is supported via mounting elements 34 such that it can vibrate as it is indicated by the double headed arrows. Underneath the distributing element a conveying device 40 is arranged, which comprises conveying rollers 42, by means of which a wood material board 44 (or maybe an impregnated paper) can be passed underneath the device 1. The particles to be sprinkled fall out of container 20 via the distributing element 30 onto the surface 46 of the wood material boards 44 and are thus uniformly distributed onto the surface 46 due to the vibration of the distributing element 30.

The wood material board 44 is, as it is the case with all the embodiments described herein, preferably a laminate panel, comprising a carrier board made from MDF or HDF material as well as a decor paper, which is glued to the top surface 46 of the wood material board 44. As it was explained above, the decor paper is impregnated with a resin, as for example an amino- or melamine resin and still wet when it is passed underneath the device 1. The sprinkled particles will sink at least partially into the yet wet resin impregnation and form therewith, after curing of the resin and a subsequent pressing, an extremely abrasion-resistant surface.

However, it should be clear to the skilled person that the invention is likewise suitable to sprinkle only the impregnated paper which may than for example be conveyed by means of suitable rollers underneath the device. In other words: The device is suitable to handle impregnates before the same are for example further processed to laminate panels.

Figure 2:
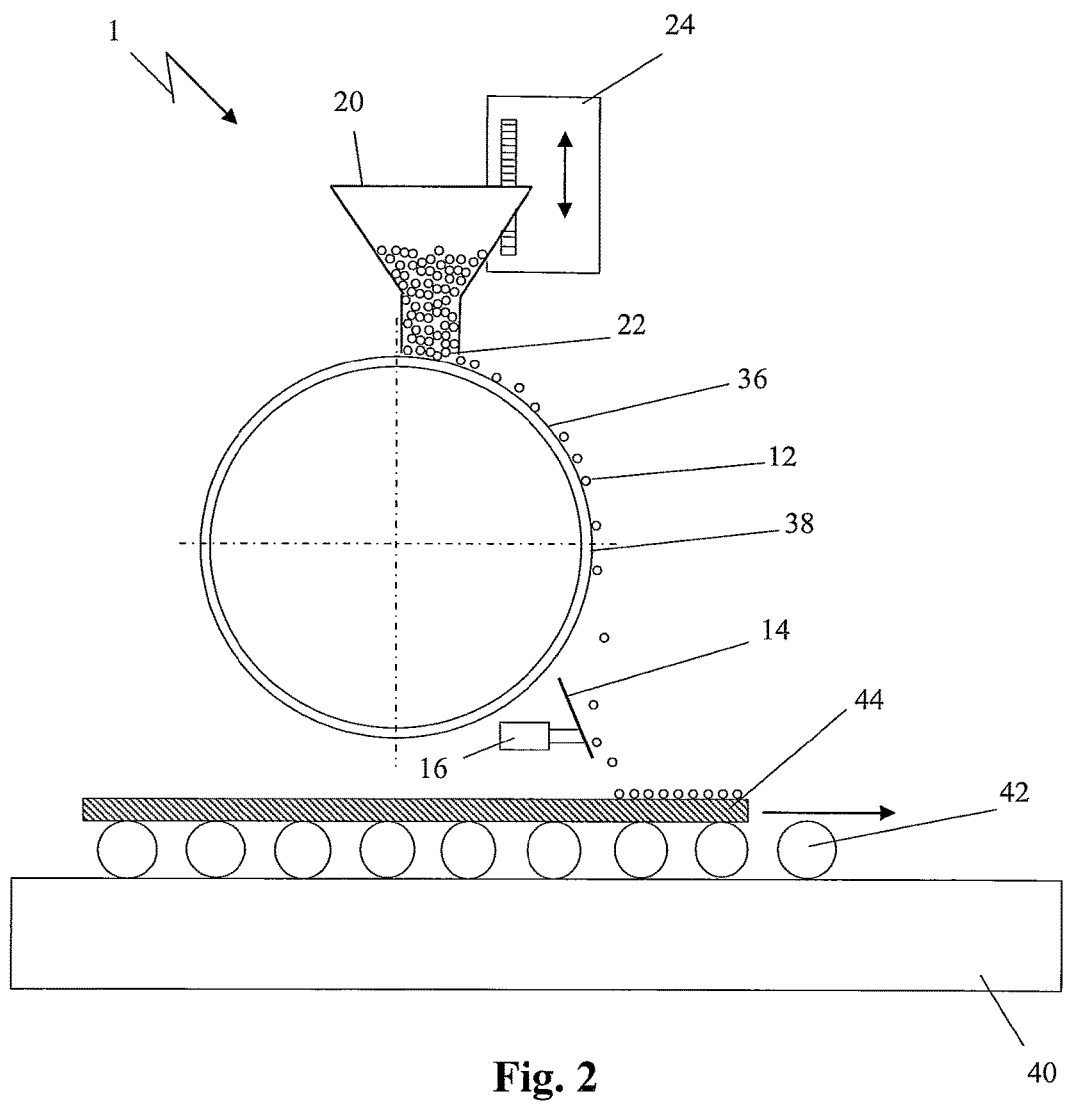
FIG. 2 is a schematic side view of the device of FIG. 1.

In FIG. 2 device 1 is shown in a side view. In the side view the rollers 42 of the conveying device are well visible. The arrow next to the wood material board 44 indicates the direction of movement of board 44. In FIG. 2, also particles 12 are schematically shown, as they are falling out of container 20 via the curved surface 36 of the distributing element 30, respectively are conveyed by means of the vibration of the distributing element 30 downwards. The container 20 comprises a scatter opening 22 for the dispersion of the particles 12. The container 20 is arranged at an apparatus 24, by means of which the container 20 can be moved vertically. In this way, the distance between the scatter opening 22 and the distributing element 30 can be increased or decreased. Of course, also other means may be suitable to adjust the distance to the surface of the distributing element. The distance between scatter opening and surface of the distributing element is preferably—as in all the inventive embodiments—adjusted such that without any vibration of the distributing element no particles will fall out of the scatter opening. Only by transferring the vibration from the distributing element onto the packed bed of particles in the container the same are literally "shaken out" of the opening.

In FIG. 2 it is indicated that the surface of the distributing element 30 is provided with the coating 38. The coating 38 consists of a rubber coating applied by a vulcanization process. In FIG. 2 further a baffle plate 14 is shown, by means of which the movement of particles 12 can be influenced. The baffle plate 14 is preferably arranged adjustable, to better influence the dispersion of the particles onto the surface of the panel 44 as well as the air current. Further, the baffle plate is provided with a vibrator means 16, by means of which for one the dispersion can be further influenced and on the other hand an adhesion of particles 12 onto the surface of baffle plate 14 can be prevented. Alternatively, it is for example possible to connect baffle plate 14 mechanically with the distributing element 30 or the means 32, so that the vibrations of the distributing element respectively the means 32 are transferred to the baffle plate 14. In this case, the separate vibrating means 16 may be omitted.

The distributing element shown in the figures is preferably a steel roller and has for example a length between one and three meters and a diameter between 80 and 300 millimeters. The scatter opening 22 is for example a slot having a length of between one and three meters and a width of between one and three millimeters. It should be clear to the skilled person that the schematic illustrations are not up to scale, but are partially enlarged to show certain details more clearly. This is in particular true for the scatter opening 22 as well as the particles 12 shown. The particles to be sprinkled are usually, in particular in the case of abrasion-resistant particles, as for example corundum particles, which are used to sprinkle the surface of laminate panels, in the scale of micro meters.

Figure 3:
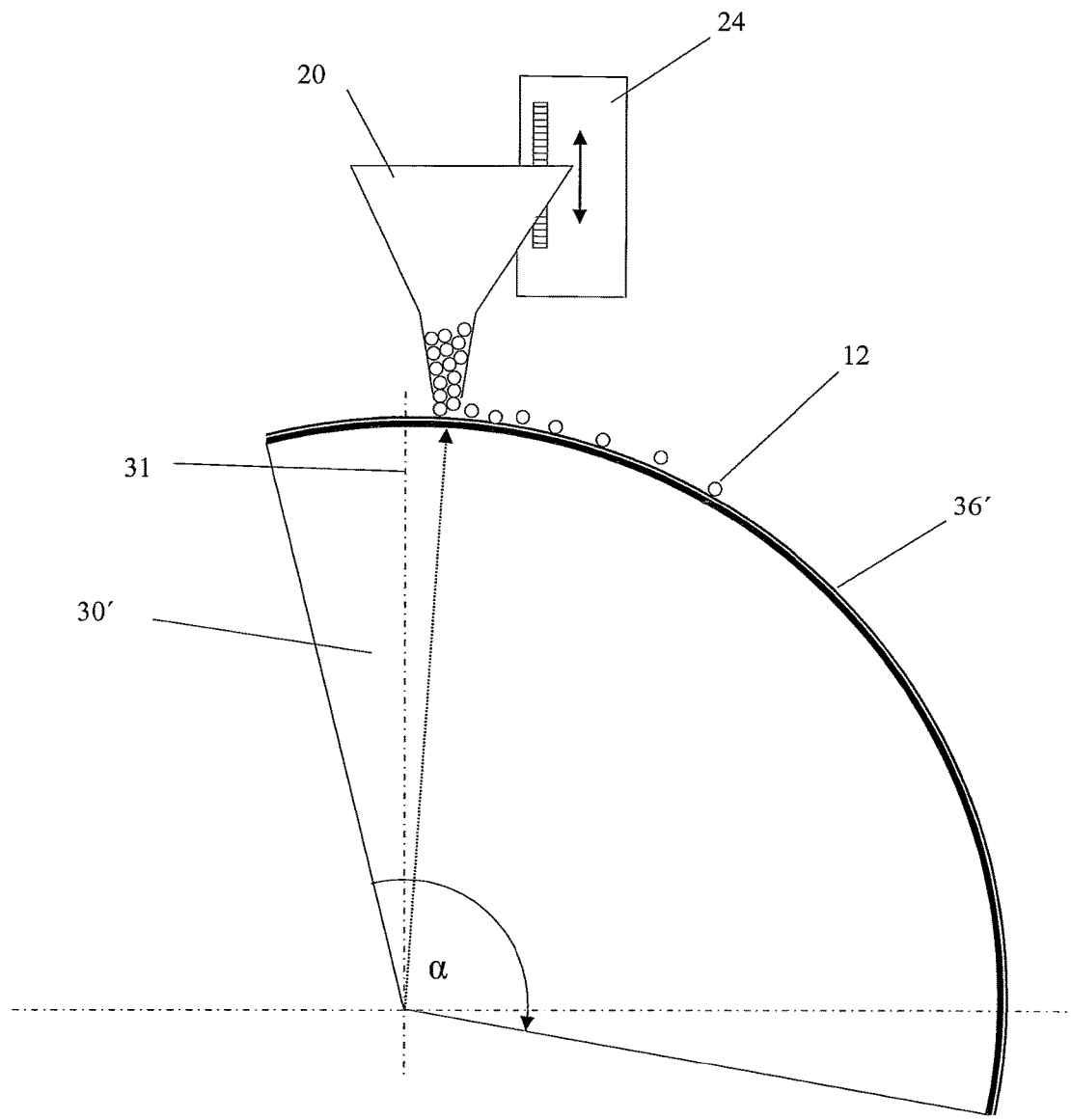
FIG. 3 is a schematic side view of a further embodiment of the invention.

In FIG. 3 an alternative distributing element 30' is shown. Also the distributing element 30' is roller like, however it does not have a round, but rather a quarter circular cross section. The effective curved surface 36', i.e. the surface which comes into contact with the particles 12 to be sprinkled and which is responsible for the distributing of these particles, has a circular arch with an inscribed angel α of approximately 100°. One has to be sure that due to the unsymmetrical form no uncontrolled motions occur. As one can further clearly see from FIG. 3, the scatter opening is arranged some degrees offset from the vertical centre line 31 of the distributing element. In this way it is secured, that the particles 12 to be distributed will fall downward essentially in the desired direction to the right in the figure.

5. PRIORITY

This application claims priority of European Patent Application No. 08 017 203.4 filed on Sep. 30, 2008, which is hereby incorporated herein by reference.

The invention claimed is:

1. A device to disperse corundum particles onto a surface of wood material panels or impregnates, comprising:
  a container to hold the corundum particles to be dispersed with at least one scatter opening to dispense particles;
  a distributing element with a curved surface having a rubber coating with a Shore A hardness between 50 and 80, wherein the scatter opening is arranged above the curved surface and means are provided, by means of which the distributing element can be brought into vibration in a longitudinal direction, such that corundum particles fall out of the scatter opening via the curved surface downwards in the direction of the surface to be sprinkled, and wherein the distributing element is mounted non-rotatably around its longitudinal axis, and the curved surface of the distributing element is formed as a circular arc and configured for sprinkling action of the particles; and
  a baffle plate, which is arranged underneath the distributing element to deflect the corundum particles falling downwardly via the curved surface, and wherein the baffle plate is adjustable to provide a desired dispersion of the corundum particles onto the surface.

2. A device according to claim 1, wherein the line of curvature of the curved surface is a circular arc and in particular with an inscribed angle α of at least 70°.

3. A device according to claim 1, wherein the distributing element is a roller and the scatter opening is a scatter slot, which is arranged parallel to the longitudinal axis of the roller.

4. A device according to claim 1, further comprising the corundum particles.

5. A device according to claim 1, wherein the scatter opening is formed such that corundum particles can fall out of the scatter opening due to gravity and that between the scatter opening and the curved surface of the distributing element a distance is provided, which is chosen small enough, such that without any vibration of the distributing element, no corundum particles will fall out of the scatter opening.

6. A device according to claim 1, wherein the distributing element is a steel roller with a length between 1 and 3 meters and a diameter between 80 and 300 mm and in that the scatter opening is a scatter slot, which is between 1 and 3 meters long and has a width of between 1 and 3 mm.

7. A device according to claim 1, wherein the distributing element is a steel roller and the scatter opening is a scatter slot, which is arranged parallel to the longitudinal axis of the roller and which is offset by 1 to 30° from the vertical centre line of the steel roller.

8. A device according to claim 1, wherein the distance between scatter opening and curved surface of the distributing element is adjustable to vary the amount of dispersed corundum particles.

9. A device according to claim 1, wherein the means to bring the distributing element into vibration works in a frequency range of 10 to 250 Hz.

10. A device according to claim 1, further comprising a vibrator for vibrating the baffle plate.

11. A device according to claim 1, wherein the baffle plate is connected with the distributing element, such that the vibration can be transferred from the distributing element to the baffle plate.

12. A device according to claim 1, wherein the line of curvature of the curved surface is a circular arc.

13. A device according to claim 1, wherein the line of curvature of the curved surface is a circular arc and in particular with an inscribed angle α of at least approximately 90°.

14. A device according to claim 1, wherein the means to bring the distributing element into vibration works in a frequency range of 20 to 150 Hz.

15. A device according to claim 1, wherein the means to bring the distributing element into vibration works in a frequency range of 30 to 80 Hz.

16. A device according to claim 7, wherein the scatter slot is offset by 3 to 20° from the vertical centre line of the steel roller.

17. A device according to claim 7, wherein the scatter slot is offset by 5 to 15° from the vertical centre line of the steel roller.

18. A device according to claim 8, wherein the distance between scatter opening and curved surface of the distributing element is adjustable over the whole width of the scatter opening independently to vary the amount of dispersed corundum particles.

* * * * *